*(12)* United States Patent
Khosrowpour et al.

(10) Patent No.: US 8,234,442 B2
(45) Date of Patent: Jul. 31, 2012

(54) METHOD AND APPARATUS FOR IN-PLACE HOLD AND PRESERVATION OPERATION ON OBJECTS IN CONTENT ADDRESSABLE STORAGE

(75) Inventors: Farzad Khosrowpour, Pflugerville, TX (US); William B. Canaday, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 292 days.

(21) Appl. No.: 12/760,642

(22) Filed: Apr. 15, 2010

(65) Prior Publication Data

US 2011/0258375 A1 Oct. 20, 2011

(51) Int. Cl.
*G06F 17/30* (2006.01)
*G06F 12/00* (2006.01)

(52) U.S. Cl. ............... 711/108; 707/999.103; 711/161; 711/E12.001

(58) Field of Classification Search ............ 711/108, 711/161, E12.001; 707/999.103
See application file for complete search history.

(56) References Cited

U.S. PATENT DOCUMENTS

| 5,878,433 | A | * | 3/1999 | Miyamoto | 1/1 |
| 7,107,416 | B2 | | 9/2006 | Stuart et al. | |
| 2009/0157740 | A1 | * | 6/2009 | Barley et al. | 707/103 R |

OTHER PUBLICATIONS

EMC Corporation, EMC Solution for eDiscovery Collection, Automate Collect and Hold of Unstructured Content, http://chucksblog.typepad.com/content/SolutioneDiscoveryCollection.pdf, 2008.
Guidance Software, Inc., Guidance Software Announces EnCase Legal Hold, http://articles.technology.findlaw.com/2008/Oct/15/11214.html, printed Jun. 17, 2010.
EDRM, The Electronic Discovery Reference Model, edrm.net, printed Jun. 17, 2010.

* cited by examiner

*Primary Examiner* — Kevin Ellis
*Assistant Examiner* — Mehdi Namazi
(74) *Attorney, Agent, or Firm* — Hamilton & Terrile, LLP; Stephen A. Terrile

(57) ABSTRACT

A method and apparatus for performing a hold operation while keeping the data in place as the data is in a hold state. Such a method and apparatus substantially eliminates the need for a copy operation and thus provides advantages cost and management savings. The method and apparatus define a hold delete operation along with hold life points in a CAS system.

15 Claims, 3 Drawing Sheets

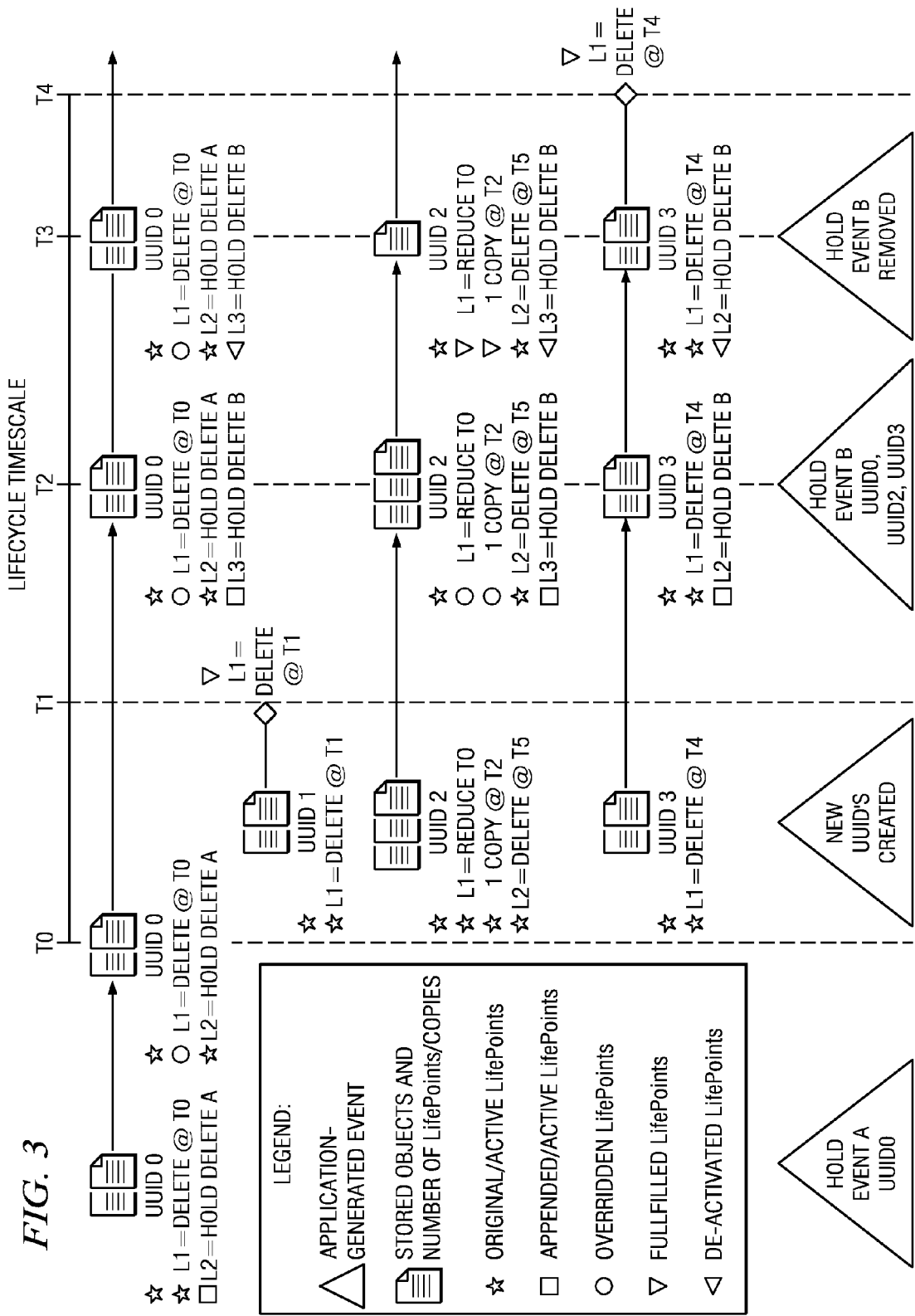

METHOD AND APPARATUS FOR IN-PLACE HOLD AND PRESERVATION OPERATION ON OBJECTS IN CONTENT ADDRESSABLE STORAGE

BACKGROUND OF THE INVENTION

1. Field of the Invention

The present invention relates to information handling systems and more particularly to hold and preservation operations on objects stored within a content addressable storage archive system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A known data storage system is a content-addressable storage (CAS) archive system. Known CAS systems store information that can be retrieved based on its content or based on a unique association identified with the content, not its storage location. Such a CAS system is often used for storage and retrieval of fixed content, such as documents stored for compliance with government regulations. One issue for CAS systems relates to compliance requirements that may be associated with certain types of data that are stored on the CAS systems. For example, information associated with litigation and corporate audits are often governed by certain regulatory and compliance requirements. Specific storage system features and behaviors are expected to be applied to this information to meet the compliance requirements applied to these types of information.

One example of these requirements is when a compliance application demands or requests a hold operation on the information that is stored in a storage pool such as the archiving system. When objects are in a hold state, the objects cannot be altered or deleted. Applications locate relevant information that should be included in the hold operation and prevent the information from being modified, deleted, or tampered. Often such solutions either perform a copy operation on the original data and hold the new copy or protect the content and metadata associated with the information via one or more file locking schemes. The process of copying this information set can be an expensive business operation requiring additional storage/data centers as well as infrastructure and time. Post hold operations may also be expensive because these operations often require delete and reallocation operations be applied to the previously held information.

SUMMARY OF THE INVENTION

In accordance with the present invention, a method and apparatus for performing a hold operation while keeping the data in-place as the data is in a hold state is set forth. Such a method and apparatus substantially eliminates the need for a copy operation and thus provides advantages cost and management savings. The method and apparatus define a hold delete operation along with hold life points in a CAS system. Such a method and apparatus also provide the ability to extend a hold delete operation on a selective per object basis.

In certain embodiments, the hold delete operation along with hold life points provides a CAS solution which return a unique user ID (UUID) for every object that is stored in the CAS system. This unique user ID is later used for retrieval and modification of the object. Using the method, a list of UUIDs that need to be kept on hold is provided to the CAS system. The CAS system flags all these UUIDs to be on hold overriding any current mutability characteristics.

In certain embodiments, a single UUID may be assigned N number of concurrent hold operations. Therefore, hold delete and hold life points is cascade-able. The method and apparatus allows changing the life cycle of objects while objects are on hold despite the fact that legal hold overrides the life cycle. Upon removal of the hold condition, the newly applied life cycles to the object are in effect. The only alteration that is permitted (but not required) during a hold operation is addition of life points to increase the redundancy. Also, in certain embodiments, the CAS system can further operate on the objects on behalf of system policies (e.g., the system can create redundant copies of an object that is being put on hold to avoid data loss).

More specifically, in one embodiment, the invention relates to a method for performing a hold operation within a content addressable storage system. The method includes storing a plurality of objects within the content addressable storage archive system; associating a life cycle point value with each of the plurality of objects; determining whether a hold event is present; updating the life cycle point value based upon whether the hold event is present; and, maintaining the objects within the content addressable storage archive system based upon the life cycle point value.

In another embodiment, the invention relates to an apparatus for performing a hold operation within a content addressable storage archive system. The apparatus includes means for storing a plurality of objects within the content addressable storage archive system; means for associating a life cycle point value with each of the plurality of objects; means for determining whether a hold event is present; means for updating the life cycle point value based upon whether the hold event is present; and, means for maintaining the objects within the content addressable storage archive system based upon the life cycle point value.

In another embodiment, the invention relates to an information handling system. The information handling system includes a processor and a content addressable storage system coupled to the processor. The content addressable storage system includes a system for performing a hold operation within a content addressable storage system. The system for performing the hold operation comprising instructions for: storing a plurality of objects within the content addressable storage archive system, the system for storing a plurality; associating a life cycle point value with each of the plurality of objects; determining whether a hold event is present; updating the life cycle point value based upon whether the hold event is present; and, maintaining the objects within the content addressable storage archive system based upon the life cycle point value.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 shows a block diagram of an example lifecycle timescale.

DETAILED DESCRIPTION

Figure 1:
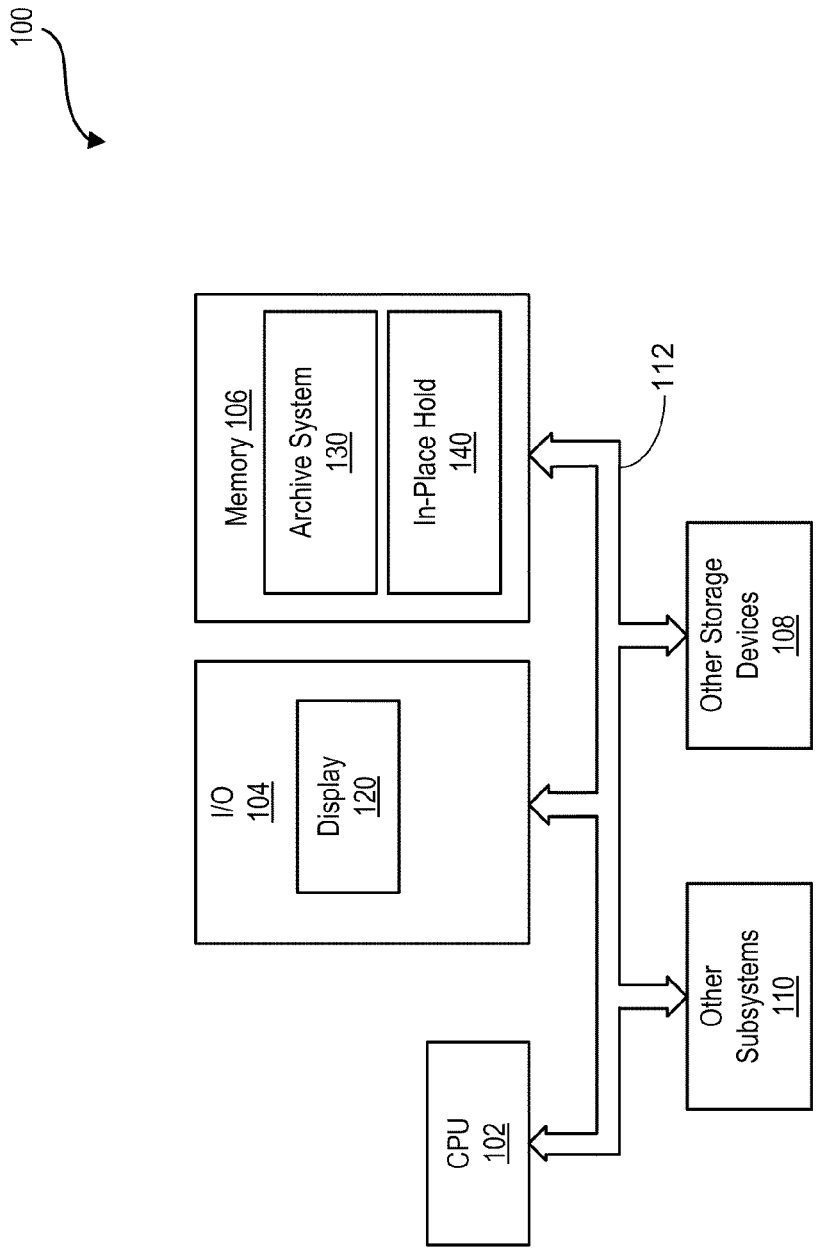
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display 120, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

The memory 106 further includes a CAS system 130 as well as a system 140 for performing a hold operation while keeping the data in-place as the data is in a hold state. Such a system 140 substantially eliminates the need a copy operation and thus provides advantages cost and management savings. The system 130 defines a hold delete operation along with hold life points and life cycles in a CAS system. The system 140 includes instructions stored on a computer readable memory and executable by the processor 102.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
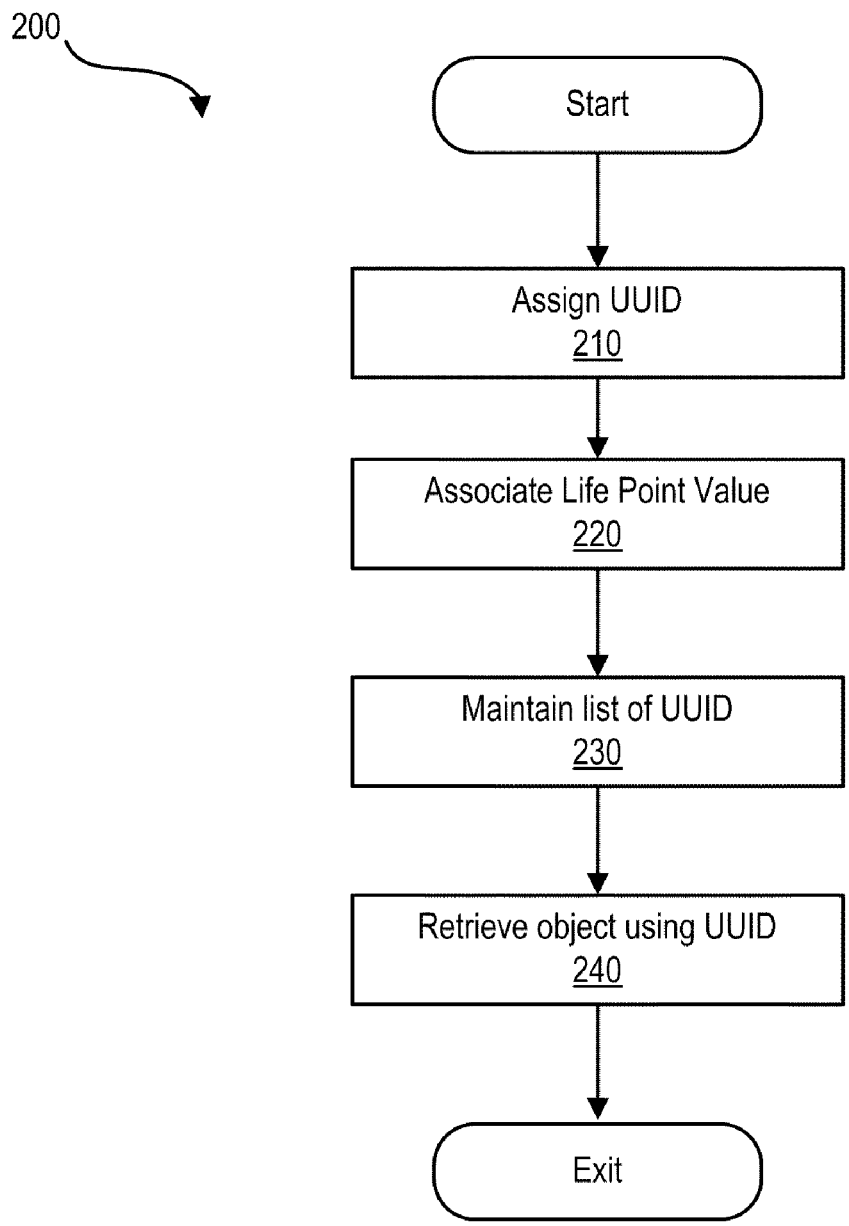
FIG. 2 shows a flow chart of the operation of an in place hold system.

FIG. 2 shows a flow chart of the operation of an in place hold system such as the system 140. More specifically, in operation, the system 200 starts operation by assigning a unique user identifier (UUID) for every object that is stored within the CAS system 130 at step 210. Next at step 220, the system 200 associates a life point value with each unique user identifier. Next, at step 230, a list of UUIDs that need to be kept on hold is maintained by the system 200. The system 200 uses the list to flag all UUIDs that are to be on hold, thereby overriding mutability characteristics of the objects associated with the UUIDs. Next, at step 240, the unique user identifier as well as the maintained list is used for retrieval and modification of the object.

Referring to FIG. 3, a block diagram of an example lifecycle timescale is shown. More specifically, a first unique user identifier (UUID0) is created sometime before time T0. The first unique user identifier has an associated original life point value which would authorize deletion of the first unique identifier at time T0 (L1=Delete @ T0). However, in this example, this first unique user identifier also has a preexisting hold delete event. This preexisting hold delete event is indicated by an active life point value (L2=Hold Delete A).

Next, sometime between times T0 and T1, three additional unique user identifiers (UUID1, UUID2, UUID3) are created. The user ID UUID1 includes an associated original life point value which authorizes deletion of this user ID at time T1 (L1=Delete @ T1). The user ID UUID2 includes three copies of objects and an original life point value which authorizes reduction of objects associated with the user ID to a single copy at time T2 (L1=Reduce to 1 copy @ T2). The user ID UUID2 also includes an associated life point value which authorizes deletion of the user ID at time T5 (L2=Deleted @ T5). The user ID UUID3 includes an original life point value which authorizes deletion of this ID at time T4 (L1=Delete @ T4).

Next, at time T1, the user ID UUID1 expires becomes deleteable. However, just because the user ID is deleteable does not necessarily mean that the user ID will be deleted. More specifically, when an application that owns the UUID decides that the object is no longer needed, the object may be deleted.

UUID2 is mutable (i.e., the object can be changed after it is created) and can be deleted at any time. An object can be mutable at the time it is created (e.g., UUID2). Alternately, an object can be immutable with a specific life cycle. E.g., specific life points may expire and indicate that an object can be deleted, otherwise the object is not modifiable.

The user ID UUID2 starts with a life point value of three in the cluster associated with the user ID (as indicated by the three objects that were associated with the user ID when the user ID was created). At time t2, based upon the life point value that indicates that the user ID can be reduced to a single copy, the life point value for user ID UUID2 would reduce to a life point value of one at time T2. Additionally, based upon the life point value that authorizes deletion of the ID at time T4, the user ID UUID3 expires at time T4 and can thus be deleted.

Moving on with the example, a hold event (such as a legal hold event) can occur any time between time T1 and time T2. When the hold event occurs, the system 200 provides a list of UUIDs 0-3 to the CAS system. The life cycles of these UUIDs are overwritten and held and life point values of the respective UUID are frozen until the hold event is removed. The life cycles and the life point values of a particular UUID are relatively independent and can be changed based upon respective policies.

Next, at time T3, the hold event is removed which causes an update to the list of UUIDs. Because the life cycle of object with UUID1 is expired, the object is removed. User ID UUID2 is once again mutable; the life point value of the this user ID is reduced to one copy. User ID UUID3 remains immutable until time T4. Because this user ID is still immutable, it incurs no lifecycle changes at time T3. User ID UUID0 remains unchanged under the existing hold delete event because that hold has not been revoked.

By using the system 200, a need for copying data and then retaining data for hold operation is eliminated. When a UUID is in hold state, the object is unchangeable and the only allowed operation is a read function. Therefore the original content of the object is preserved in place. Furthermore, the benefit of holding information with a CAS backend rather than an application that is accessing the data is a reduction of issues such as tampering or fault proofing. In a CAS system, because the addressability requires a valid UUID, there is no explicit information available on where the data is stored. Hence, storing the data within a CAS system includes inherent security.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for performing a hold operation within a content addressable storage archive system comprising:
   storing a plurality of objects within the content addressable storage archive system;
   associating a life cycle point value with each of the plurality of objects;
   determining whether a hold event is present;
   updating the life cycle point value based upon whether the hold event is present; and,
   maintaining the objects within the content addressable storage archive system based upon the life cycle point value.

2. The method of claim 1 wherein:
   the life cycle point value comprises hold life points; and
   the life cycle point value is updated to include the hold life points when the hold event is present.

3. The method of claim 1 wherein:
   the storing comprises associating a unique user identifier with each of the plurality of objects;
   the unique user identifier is used for retrieval and modification of an associated object.

4. The method of claim 3 further comprising:
   generating a list of unique user identifiers subject to the hold event based upon the life cycle point value of each of the plurality of objects.

5. The method of claim 1 wherein:
   the life cycle point value indicating that the hold event is present to override any current mutability characteristics of an object.

6. An apparatus for performing a hold operation within a content addressable storage archive system comprising:
   means for storing a plurality of objects within the content addressable storage archive system;
   means for associating a life cycle point value with each of the plurality of objects;
   means for determining whether a hold event is present;
   means for updating the life cycle point value based upon whether the hold event is present; and,
   means for maintaining the objects within the content addressable storage archive system based upon the life cycle point value.

7. The apparatus of claim 6 wherein:
   the life cycle point value comprises hold life points; and
   the life cycle point value is updated to include the hold life points when the hold event is present.

8. The apparatus of claim 6 wherein:
   the storing comprises associating a unique user identifier with each of the plurality of objects;
   the unique user identifier is used for retrieval and modification of an associated object.

9. The apparatus of claim 8 further comprising:
   means for generating a list of unique user identifiers subject to the hold event based upon the life cycle point value of each of the plurality of objects.

10. The apparatus of claim 6 wherein:
    the life cycle point value indicating that the hold event is present to override any current mutability characteristics of an object.

11. An information handling system comprising:
    a processor;
    a content addressable storage archive system coupled to the processor, the content addressable storage system comprising a system for performing a hold operation within a content addressable storage system, the system for performing the hold operation comprising instructions for:
       storing a plurality of objects within the content addressable storage archive system,
       associating a life cycle point value with each of the plurality of objects;
       determining whether a hold event is present;
       updating the life cycle point value based upon whether the hold event is present; and,
       maintaining the objects within the content addressable storage archive system based upon the life cycle point value.

12. The information handling system of claim 11 wherein:
the life cycle point value comprises hold life points; and
the life cycle point value is updated to include the hold life points when the hold event is present.

13. The information handling system of claim 11 wherein:
the storing comprises associating a unique user identifier with each of the plurality of objects;
the unique user identifier is used for retrieval and modification of an associated object.

14. The information handling system of claim 13 wherein the system for performing the hold operation further comprises instructions for:

generating a list of unique user identifiers subject to the hold event based upon the life cycle point value of each of the plurality of objects.

15. The information handling system of claim 11 wherein:
the life cycle point value indicating that the hold event is present to override any current mutability characteristics of an object.

* * * * *